United States Patent [19]

Schätzler

[11] 4,254,989
[45] Mar. 10, 1981

[54] DEVICE FOR A VERTICAL AND HORIZONTAL ADJUSTMENT OF A SLIDING COVER FOR A SLIDING ROOF FOR A MOTOR VEHICLE

[75] Inventor: Walter Schätzler, Aufhausen, Fed. Rep. of Germany

[73] Assignee: Webasto-Werk W. Baier GmbH and Co., Fed. Rep. of Germany

[21] Appl. No.: 941,465

[22] Filed: Sep. 12, 1978

[30] Foreign Application Priority Data

Sep. 22, 1977 [DE] Fed. Rep. of Germany ....... 2742654

[51] Int. Cl.³ .............................................. B60J 7/04
[52] U.S. Cl. ..................................... 296/216; 296/215
[58] Field of Search ............ 296/137 R, 137 B, 13 E, 296/13 F, 13 G, 13 H

[56] References Cited

U.S. PATENT DOCUMENTS

| 3,066,975 | 12/1962 | Larche | 296/137 E |
|---|---|---|---|
| 3,905,640 | 9/1975 | Lutz . | |
| 3,970,343 | 7/1976 | Horn | 296/137 E |
| 3,993,348 | 11/1976 | Pizzuti | 296/137 E |
| 4,085,965 | 4/1978 | Schlapp | 296/137 F |
| 4,089,557 | 5/1978 | Leiter | 296/137 F |

FOREIGN PATENT DOCUMENTS

| 1078455 | 3/1960 | Fed. Rep. of Germany ....... 296/137 E |
| 1229859 | 12/1966 | Fed. Rep. of Germany ....... 296/137 F |
| 1282481 | 11/1968 | Fed. Rep. of Germany ....... 296/137 E |
| 1655543 | 7/1970 | Fed. Rep. of Germany ....... 296/137 E |
| 2313453 | 9/1974 | Fed. Rep. of Germany ....... 296/137 E |

Primary Examiner—David M. Mitchell
Assistant Examiner—Ross Weaver
Attorney, Agent, or Firm—Craig and Antonelli

[57] ABSTRACT

A device for vertical and horizontal adjustment of a sliding cover for an opening in a vehicle body member such as a sliding roof or the like of a motor vehicle of the type wherein the cover is guided on each side by means of at least one guide shoe along guide tracks disposed on the body member is designed to provide an arrangement which requires extremely little room and extends as little as possible beyond the inner edge of the roof frame surrounding the roof opening, allows precise adjustment of the sliding cover relative to the guide shoe support, both vertically and laterally, and is readily accessible. According to a preferred embodiment, the guide shoe support is provided with an adjusting element that is displaceable crosswise with respect to the lengthwise axis of the vehicle, the element cooperating by sloping surfaces with a sliding cover to provide height adjustment thereof, and the sliding cover being connected with the guide shoe support for lateral adjustment of the cover crosswise to the direction of sliding movement of the sliding cover. The sloping surfaces are provided by two parts of the adjustment element, one of which is mounted on the guide shoe support and which receives sloping tracks of a holder element mounted on the sliding cover.

8 Claims, 5 Drawing Figures

4,254,989

DEVICE FOR A VERTICAL AND HORIZONTAL ADJUSTMENT OF A SLIDING COVER FOR A SLIDING ROOF FOR A MOTOR VEHICLE

BACKGROUND AND SUMMARY OF THE INVENTION

The invention relates to a device for vertically and horizontally adjusting a sliding cover for a vehicle body member such as a roof.

In a known device (German Pat. No. 12 05850), the guide shoe support is provided with lengthwise slots running at right angles to the lengthwise axis, with bolts extending through said lengthwise slots and fastening the guide shoe supports to a holder mounted on the sliding cover. By loosening these bolts, the sliding cover can be slid relative to the guide shoe support at right angles to the lengthwise axis of the vehicle, thus permitting lateral adjustment. A locking bolt for height adjustment of the sliding cover is guided in a lengthwise slot in the guide shoe support, said bolt likewise being threaded into the above-mentioned holder and raising or lowering the sliding cover relative to the guide shoe support as the bolt is turned. Hence, the sliding cover can be adjusted heightwise in such a manner that it is flush with the solid part of the vehicle roof when in the closed position.

In this known device, the guide shoe support must extend inward at a relatively large distance from the lateral edge of the cover, so that the bolts which on the one hand fasten the guide shoe support to the sliding cover and on the other hand permit height adjustment of the sliding cover and are disposed vertically, are accessible from below. When the sliding cover consists of a transparent panel held only at its edges by a frame, which supports the guide elements for the cover, this guide shoe support would extend far out into the transparent area of the sliding cover, resulting in an undesirable appearance, or the cover frame would have to be made correspondingly wide, thus reducing the transparent area of the cover. Another disadvantage of the known device consists in the fact that the lateral adjustment of the cover cannot be carried out precisely.

The invention is, therefore, intended to provide a device of the type described hereinabove which requires extremely little room and extends as little as possible beyond the inner edge of the roof frame surrounding the roof opening, allows precise adjustment of the sliding cover relative to the guide shoe support, both vertically and laterally, and is readily accessible.

This goal is achieved according to the invention by virtue of the fact that the guide shoe support is provided with an adjusting element which is displaceable relative to the lengthwise axis of the vehicle, said element cooperating with the cover by sloping surfaces, and by the fact that on the one hand the cover is connected so that it is displaceable together with the guide shoe support crosswise with respect to the lengthwise axis of the vehicle for lateral adjustment, and on the other hand the adjusting element is connected so that it is displaceable crosswise with respect to the lengthwise axis of the vehicle together with the cover to permit height adjustment.

Because both the height adjustment and the lateral adjustment are accomplished by the displacement of one part in each case, namely, the adjusting element in one case and the sliding cover in the other, as well as the guide shoe support, crosswise with respect to the lengthwise axis of the vehicle and in a horizontal plane, adjusting bolts can be provided to shift the sliding cover and the adjusting element relative to the cover, said bolts being provided so that they are displaceable essentially horizontally and parallel to one another and in vertical slots in a holder mounted on the cover. As a result, the guide shoe support need not be brought out relatively far beyond the inner edge of the roof frame, as in the known design, inasmuch as the bolts are still accessible when they are covered by the roof frame from below. As mentioned earlier, this is especially significant in the case of glass covers.

The adjusting element, according to one embodiment, is provided with a through slot to accept the guide shoe support and can consist of two parts, mounted on the guide shoe support, and, according to another aspect of the invention, is provided with a diagonal groove in its lateral surfaces which run parallel to the lateral edges of the guide shoe support, with an appropriately sloping track for the holder fastened to the cover being engaged appropriately with said groove. Preferably, the adjusting element consists of a visco-elastic plastic such as polyamide, for example.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
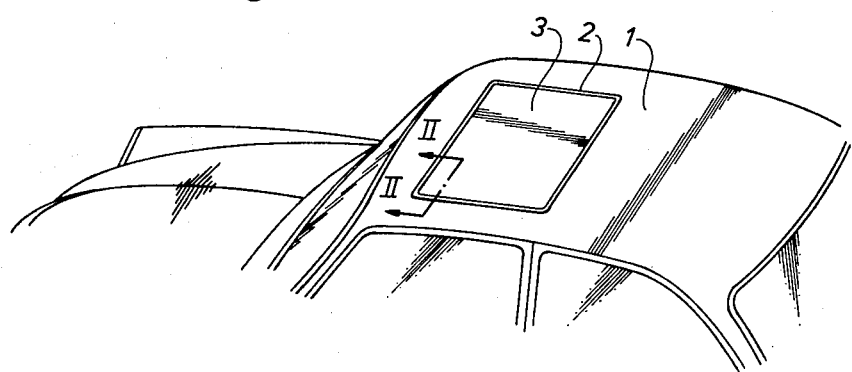
FIG. 1 is a perspective partial view of a vehicle with a sliding roof.
Figure 2:
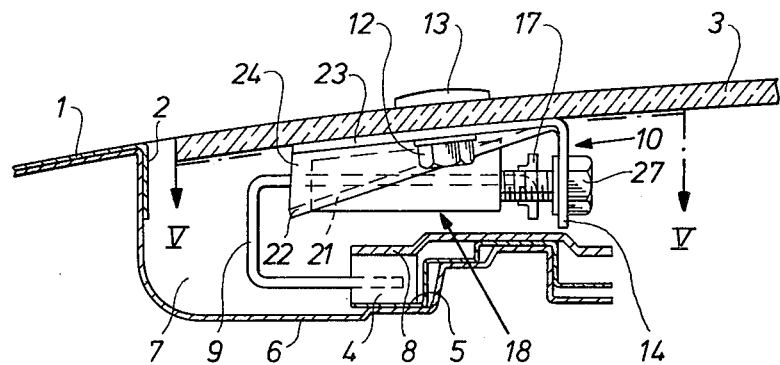
FIG. 2 is a cross section along Line II—II in FIG. 1.
Figure 3:
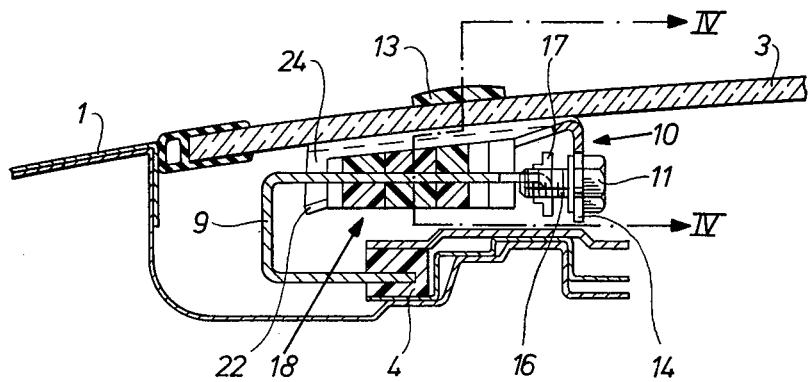
FIG. 3 is a cross section along Line III—III in FIG. 5, but with the sliding cover.

Roof 1 of the motor vehicle shown in FIG. 1 is provided with a roof cutout 2, which can be closed by a cover 3, which consists of transparent material in the embodiment. Cover 3 is designed to be exactly flush with the surrounding surface of fixed roof 1 when in its closed position, and should also rest as centrally as possible in roof opening 2, in order to produce an attractive appearance and to provide a uniform seal around the edge of the sliding cover.

Figure 4:
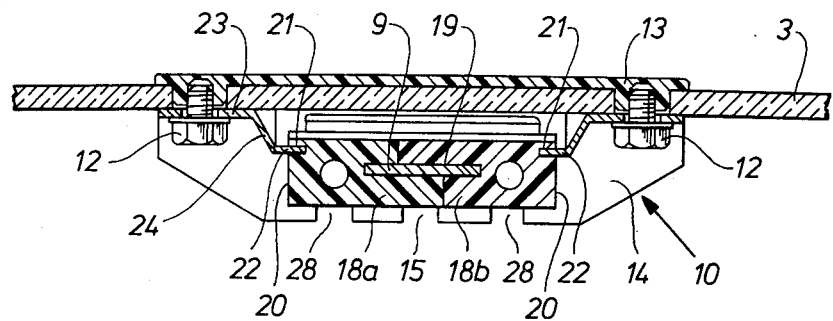
FIG. 4 is a cross section along Line IV—IV in FIG. 3.

Sliding cover 3 is connected on each side in the vicinity of its forward edge with a guide shoe 4, said shoe being guided in a guide track 5, said track being delimited by boundary wall 6 of a rain gutter 7 and a cover panel 8. Guide shoe 4 is fastened to a hoop-shaped guide shoe support 9, bolted to a holder 10 by means of a bolt 11. Holder 10 is fastened to cover 3 by bolts 12, which pass through cover 3 and are threaded into component 13 mounted externally on cover 3. Holder 10 is provided with a flange extending downward from cover 3, with a slot 15 (FIG. 4) open at the bottom, said slot receiving bolt 11 and preventing it from being displaced axially. Bolt 11 is designed as a locking bolt, and its threaded part 16 extends through a nut 17, mounted on the end of guide shoe support 9. Turning bolt 11 thus displaces cover 3 relative to guide shoe 4. Of course, this lateral adjustment must be performed simultaneously on both sides of cover 3, if one of the guide shoes contacts the inside wall of its guide track 5.

Figure 5:
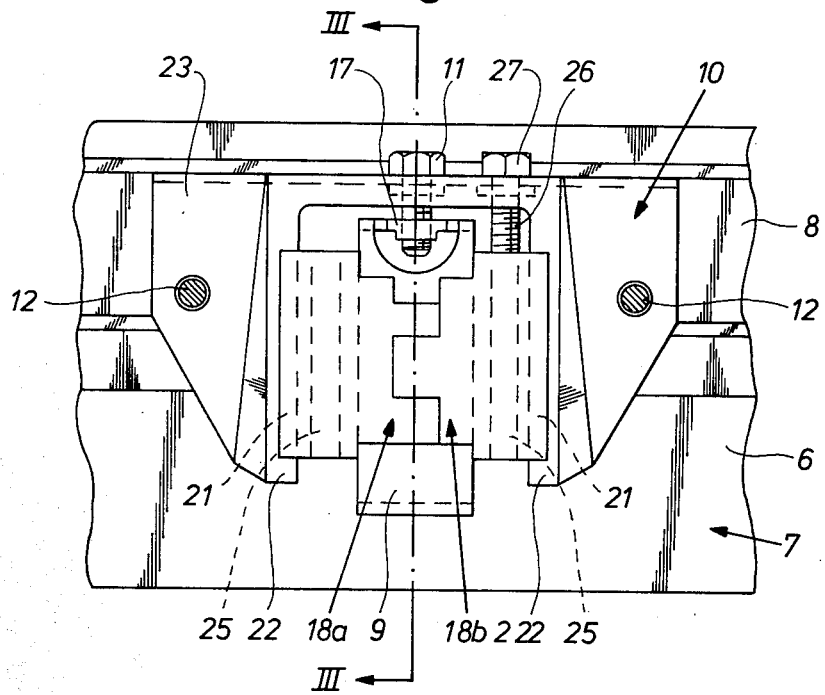
FIG. 5 is a cross section along Line V—V in FIG. 2.

An adjusting element 18 for height adjustment is displaceably mounted on guide shoe support 9, said element comprising a through slot 19 to accept guide shoe support 9 and consisting of two parts 18a and 18b, joined in the manner shown in FIG. 5. Adjusting element 18 is provided with sloping grooves 21 on its lateral surfaces 20, parallel to the lateral edges of guide shoe support 9, with appropriately sloping tracks 22 engaging said grooves, said tracks being formed by bevels on lateral tabs 24, stamped out of the surface 23 of holder 10. Parts 18a and 18b of adjusting element 18 are held together by mounting them on tracks 22.

Each part 18a and 18b of adjusting element 18 is provided with a through threaded bore 25 in order to be able to provide one adjusting bolt 27 for the left and right sides of the cover, using the same adjusting element 18, always on the side of bolt 11 which faces the middle of the cover, because it is more easily accessible there. Adjusting bolt 27 is designed once again as a locking bolt, with a threaded section 26 which engages the corresponding threaded bore 25 and is axially non-displaceable, but radially displaceable in a slot 28, open at the bottom, disposed in flange 14 of holder 10. By rotating bolt 27, adjusting element 18 is displaced along guide shoe support 9, so that sliding cover 10 is raised or lowered by the cooperating of tracks 22 with grooves 21. The lateral position of sliding cover 3 is not changed thereby, since it is held in place by bolts 11.

It is clear that the entire guide shoe assembly, including the lateral and height adjustment, when viewed from below, disappears behind the roof frame which forms the wall of rain gutter 7, and is therefore invisible. However, the horizontal arrangement of adjusting bolts 11 and 27 permits the cover to be adjusted with a screwdriver or wrench from the interior of the roof opening.

In the embodiment shown, the cover adjustment is provided only on the forward guide shoes. However, it can also be provided on the rear guide shoes.

While I have shown and described one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A device for vertical and horizontal adjustment of a sliding cover for an opening in a vehicle body member such as a sliding roof or the like of a motor vehicle, said cover being guided on each side by means of at least one guide shoe along tracks disposed on the body member, whereby the guide shoe is mounted on a guide shoe support to which the sliding cover is adjustably connected, characterized by the fact that the guide shoe support is provided with an adjusting element that is displaceable crosswise with respect to the lengthwise axis of the vehicle, said element cooperating by sloping surfaces with the sliding cover to provide height adjustment thereof and by the fact that the sliding cover is connected with said guide shoe support for lateral adjustment of said cover crosswise to the direction of sliding movement of said sliding cover, and wherein adjusting bolts are provided for displacement of the guide shoe support and adjusting element relative to the sliding cover, said bolts being disposed essentially horizontally and parallel with respect to one another and being displaceably mounted in vertical slots in a holder mounted on the cover.

2. A device according to claims 1, characterized by the fact that the adjusting element comprises a through slot which accepts the guide shoe support and includes two parts mounted on the guide shoe support and comprises a sloping groove in lateral surfaces running parallel to the lateral edges of the guide shoe support, each of said grooves accepting a correspondingly sloping track of the holder mounted on the sliding cover.

3. A device according to claim 1, characterized by the fact that the holder comprises a base plate which is beveled on one side to form a flange, said flange comprising slots to accept the adjusting bolts and is provided with an essentially rectangular cutout, said cutout extending from the side opposite the flange and forming tracks with lateral delimiting edges to guide the adjusting element.

4. A device according to claim 1, wherein said sliding cover is a transparent vehicle roof panel.

5. A device for vertical and horizontal adjustment of a sliding cover for a verticle body member of the type wherein said sliding cover is guided on each side along a guide track attached to the vehicle body member by a guide shoe mounted to a guide support, comprising a first adjustment element attached to said guide support, a second adjustment element attached to said sliding panel, engaging surfaces of said first and second adjustment elements being so shaped that upon shifting of said first adjustment element relative to said second adjustment element, the height of said sliding cover relative to said guide tracks will be changed, and displacement means adjustably moveable in a direction parallel to the plane of said sliding cover for engaging one of said adjustment elements and shifting it along the engaging surface of the other adjustment element to change the height of the sliding cover, wherein said engaging surfaces are inclined straight edges on said second adjustment element and inclined slots in said first adjustment element.

6. A device according to claim 5, further comprising displacement means for shifting said guide support relative to said second adjustment element so as to provide lateral adjustment of said sliding cover relative to the guide tracks.

7. A device according to claim 6, wherein said guide support is slideably received in said first adjustment element, and said second displacement means is slidably received by said second adjustment element for enabling said height adjustment of the sliding cover and the lateral adjustment of sliding cover to be independent of each other.

8. A device according to claim 7, wherein said sliding cover is a transparent roof panel.

* * * * *